United States Patent [19]

MacKenzie, Jr. et al.

[11] 4,085,162

[45] Apr. 18, 1978

[54] POLYOLEFIN WITH PHOSPHORYLATED NOVOLAC AND TRIALLYL CYANURATE

[75] Inventors: Burton Thornley MacKenzie, Jr., Monroe; Edward Vincent Wilkus, Trumbull, both of Conn.

[73] Assignee: General Electric Company, New York, N.Y.

[21] Appl. No.: 638,620

[22] Filed: Dec. 8, 1975

Related U.S. Application Data

[62] Division of Ser. No. 516,468, Oct. 21, 1974, Pat. No. 3,930,104.

[51] Int. Cl.$^2$ .................. C08G 8/36; C08L 23/16; C08L 61/14
[52] U.S. Cl. .................... 260/848; 260/38; 260/59 R; 260/844; 260/846; 260/DIG. 24
[58] Field of Search ........................ 260/848

[56] References Cited

U.S. PATENT DOCUMENTS

| | | | |
|---|---|---|---|
| 2,988,531 | 6/1961 | Fusco et al. | 260/848 |
| 3,119,783 | 1/1964 | Baum | 260/30.6 R |
| 3,297,478 | 1/1967 | Larsen | 428/460 |
| 3,297,631 | 1/1967 | Bown et al. | 260/848 |
| 3,367,996 | 2/1968 | Strauss et al. | 260/848 |
| 3,527,725 | 9/1970 | Strauss et al. | 260/848 |
| 3,598,771 | 8/1971 | Davis et al. | 260/858 |
| 3,697,459 | 10/1972 | Dannels et al. | 260/848 |
| 3,752,865 | 8/1973 | Scardiglia et al. | 428/379 |
| 3,817,851 | 6/1974 | Atchison et al. | 260/878 R |

*Primary Examiner*—Murray Tillman
*Assistant Examiner*—A. Koeckert
*Attorney, Agent, or Firm*—R. G. Simkins; P. L. Schlamp

[57] ABSTRACT

An electrical conductor insulated with flame-resistant polyolefin compositions comprising the combination of phosphorylated novolak-type phenol-formaldehyde condensate and triallyl cyanurate, and method of producing same.

14 Claims, 1 Drawing Figure

U.S. Patent   April 18, 1978   4,085,162
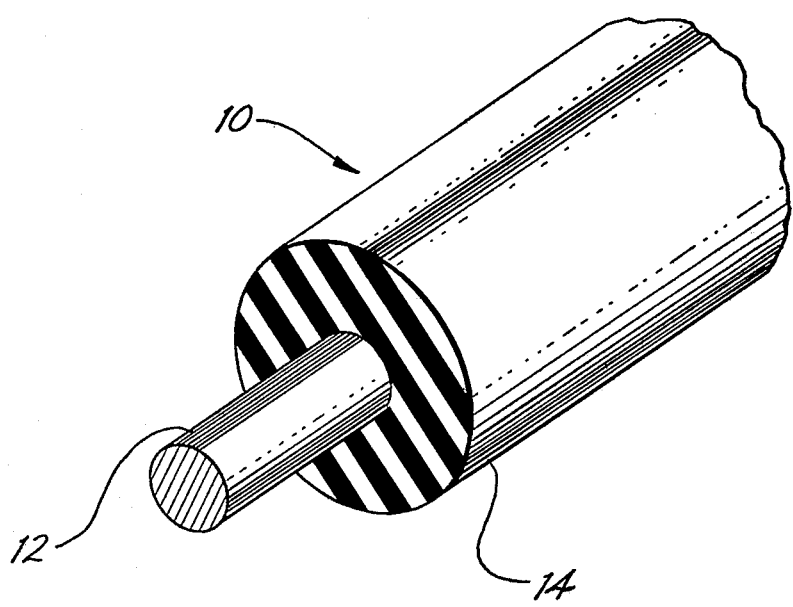

POLYOLEFIN WITH PHOSPHORYLATED NOVOLAC AND TRIALLYL CYANURATE

This is a division of application Ser. No. 516,468, filed Oct. 21, 1974, now U.S. Pat. No. 3,930,104.

BACKGROUND OF THE INVENTION

The increased use of polymeric compositions such as polyolefins in many and diverse applications or products including polyolefin insulated wires and cables, and the combustibility of polymeric materials, have greatly stimulated the investigation of flame-proofing measures for polymeric compositions. Moreover, the high costs of fire damage in lives and property, and the imposition of increasingly stringent safety regulations, have recently significantly intensified the pursuit of more effective or practical means of controlling or inhibiting combustion in many products and materials.

Notwithstanding the prior development of a great number of flame-proofing measures or additives resulting from this expanding effort, there remains a continuing need for improvements to meet current or new requirements in this area.

SUMMARY OF THE INVENTION

This invention comprises the discovery of the improved resistance to flame or combustion and other advantages attributable to the combination of phosphorylated novolak-type phenol-formaldehyde condensate and triallyl cyanurate with polyolefins such as polyethylene. The invention thus relates to polyolefin compounds and a method of rendering such compounds resistant to flame and combustion, and it has particular utility in flame-proofing electrical insulations comprising ethylene-containing polymer compounds.

OBJECTS OF THE INVENTION

It is a primary object of this invention to provide polyolefin compounds of improved resistance to flame and combustion, and a method of producing same.

It is an additional object of this invention to provide an improved flame-resistant insulated electrical conductor.

It is also an object of this invention to provide a flame-proofing material for polyolefin compounds which retains its potential to inhibit flaming and combustion of polyolefins over extended periods of time and throughout exposure to many adverse conditions, and imparts non-dripping and char-forming properties to the compound.

It is a further object of this invention to provide a polymeric compound containing a polyolefin admixed with a flame-proofing material which is highly resistant to extraction by bleeding or leaching from the compound, and which has desired thermal stability at temperatures below flame conditions and thus is not subject to loss of the flame resisting components such as due to premature decomposition or vaporization resulting from emission of its halogen at elevated temperature appreciably below those approaching flame conditions.

It is a still further object of this invention to provide a flame-proofing material and polyolefin compounds containing the same which do not discernibly corrode or tarnish metals, such as copper, and thus are serviceable as effective and practical flame-resistant polyolefin electrical insulating compositions for metal wires or cables, and other metallic electrical conductors.

BRIEF DESCRIPTION OF THE DRAWING

The drawing is a perspective illustration of an insulated conductor comprising a metallic wire having a polymeric insulation thereabout.

DESCRIPTION OF A PREFERRED EMBODIMENT

In accordance with this invention, a high level of resistance to flame and combustion is achieved in polyolefin compounds comprising ethylene-containing polymers, among other improved and advantageous attributes, by including therein the combination of phosphorylated novolak-type phenol-formaldehyde and triallyl cyanurate.

The polyolefin compositions of this invention comprise ethylene-containing polymers such as polyethylene, copolymers of ethylene and other polymerizable materials, and blends of such polymers including copolymers. Typical copolymers of ethylene and other polymerizable materials include, for example, ethylene-propylene copolymers and ethylene-propylene diene terpolymers, ethylene-vinyl acetate, ethylene-ethyl acrylate and ethylene-methyl acrylate.

The polyolefin compounds of this invention can comprise fillers, pigments, crosslinking curing agents such as organic peroxides, curing co-agents, and other conventional additives including preservatives such as antioxidants, modifying agents, mold release ingredients and the like which are commonly compounded with polyolefins.

The invention also specifically applies to and includes all of the above-referenced polyolefins in a crosslink cured and thermoset state, whether cured by means of radiation or a heat-activated peroxide crosslinking agent such as disclosed in U.S. Pat. Nos. 2,888,424, 3,079,370; 3,086,966; and 3,214,422. Suitable peroxide crosslink curing agents comprise organic tertiary peroxides characterized by at least one unit of the structure:

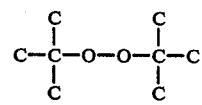

which decomposes at a temperature above about 295° F and thereby provide free radicals. A preferred peroxide is a diacumyl peroxide, and other apt peroxides comprise the tertiary diperoxides such as 2,5-dimethyl-2,5-di(t-butyl peroxy) hexane and 2,5-dimethyl-2,5-di(t-butyl peroxy) hexane-3, and the like diperoxy and polyperoxide compounds.

The phosphorylated novolak phenol-formaldehyde component of this invention consists of the reaction product of phenol formaldehyde condensation novolak resin and triphenylphosphate. For example, a phenol formaldehyde condensation novolak resin (1696 grams) of the formula:

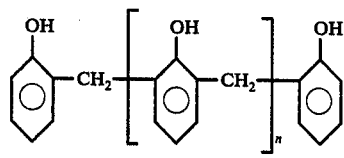

is reacted with triphenylphosphate (5740 grams) by heating in the presence of about 0.1 grams of magnesium catalyst at a temperature of about 280° C for a period of approximately 3 hours. The phosphorylated novolak phenol product comprised:

$$\left[ \begin{array}{c} O \\ \| \\ O-P-O-\phi \\ | \\ O \end{array} \right] \left[ -\phi-CH_2-\phi-CH_2- \right]_n$$

The combination of phosphorylated novolak phenol-formaldehyde and triallyl cyanurate of this invention can be mixed and combined with a polyolefin component by means of any conventional compounding method of apparatus, such as working in a Banbury mixer or on a two roll rubber mill. Preferably all ingredients of the compound formulation, except those which are sensitive to the relatively moderate mixing temperatures of about 300° to about 400° F, such as a heat decomposable peroxide curing agent, are combined and initially admixed together at a temperature sufficient to soften and plasticize the particular polyolefin ingredient. Following the attainment of substantial uniformity of the admixed ingredients, the temperature of the admixed batch is reduced below the description level of the particular peroxide curing agent, or other heat sensitive ingredient, and the curing agent or other sensitive ingredient is then introduced and dispersed preferably uniformly in the mix.

The proportions of the flame proofing combination of phosphorylated novolak phenol-formaldehyde condensate and triallyl cyanurate ingredients admixed with the polyolefin compounds depend, of course, upon the desired or required degree of resistance to flame and combustion, and the content of polymeric or other combustible materials in the compound. Suitable amounts for effective flame resistance in polyolefins comprise about 5 to about 20 parts by weight of the phosphorylated novolak phenol-formaldehyde, and about 0.5 to about 5 parts by weight of the triallyl cyanurate, per 100 parts by weight of the polyolefin or organic polymer content of the compound. However, greater or smaller quantities will suffice for particular applications.

Additionally, a significant improvement and advantage of this invention, results from the face that unlike many halogen-containing flame proofing agents, the material of this invention does not react adversely with and corrode or tarnish metals such as copper. Thus, the invention is especially useful and advantageous in providing flame-resistant polymeric electrical insulations for metallic conductors. The compositions of the invention, moreover, possess improved non-dripping characteristics under flame conditions which greatly impedes the propagation of flame.

The improvements and advantages of this invention are demonstrated by the following examples of the practice of the invention and the data derived from the examples of the invention and related prior art means or practices.

The formulations of the examples of this invention and for the comparative control standards are all given in parts by weight of the enumerated ingredients. The compositions of all examples and all control standards were prepared and evaluated identically. That is, all ingredients, except the peroxide curing agent, were initially combined and mixed on a hot two-roll mill at a temperature of about 195° F for approximately five minutes, then in each case the peroxide was subsequently added and dispersed therein by mixing for about three minutes. The examples of this invention and the control standards are as follows with Control A and Examples I through IV comprising like laboratory slab specimens, and Control B and Example V comprises specimens of wire coated with the respective compositions at a thickness of about 50 mils. Curing was effected by subjecting the slab specimens to 300° F in a press for 60 minutes, and the control wire specimen to steam at 400° F for two minutes.

| | SLAB SPECIMENS | | | | | WIRE SPECIMENS | |
|---|---|---|---|---|---|---|---|
| | | EXAMPLES | | | | | EXAMPLE |
| INGREDIENTS | Control A | I | II | III | IV | Control B | V |
| Polyethylene | 100 | 100 | 100 | 100 | 100 | 100 | 100 |
| Calcined Clay (Treated with 1% Silicone Tetramer) | 50.5 | 50.5 | 50.5 | 50.5 | 50.5 | 50.5 | 50.5 |
| Carbon Black | 5 | 5 | 5 | 5 | 5 | 5 | 5 |
| Antioxidant, Flectol H (Polymerized Trimethyl Dihydroquinoline) | 1.75 | 1.75 | 1.75 | 1.75 | 1.75 | 1.75 | 1.75 |
| Di α cumyl Peroxide | 3.3 | 3.3 | 3.3 | 3.3 | 2.2 | 3.3 | 2.2 |
| Phosphorylated Novolak Phenol-formaldehyde Condensate (PN) | — | — | 10 | 10 | 10 | — | 10 |
| Triallyl Cyanurate (TAC) | — | 0.9 | — | 0.9 | 2.2 | — | 2.2 |
| PROPERTIES | Control A | I | II | III | IV | Control B | V |
| % Toluene Extractables | 7.8 | 6.7 | 15.9 | 9.1 | — | — | — |
| Oxygen Index Slab | 0.191 Weak Char, Drips | 0.204 Weak Char, Drips | 0.221 Strong Char, No Drip | 0.236 Strong Char, No Drip | 0.240 Strong Char, No Drip | | |
| Wire Insulation | | | | | | 0.190 Weak Char, Drips | 0.224 Strong Char, No Drip |
| Copper Mirror Test % Removed after 16 hours at 175° C | 0 | 0 | 0 | 0 | 0 | 0 | 0 |
| Surface Bloom | None | None | None | None | None | None | None |

|  | SLAB SPECIMENS | WIRE SPECIMENS |
|  | EXAMPLES | EXAMPLE |
| --- | --- | --- |
| Original, Quick-Rise Dielectric Strength In Water at Room Temperature, Volts/Mil. | — — — — — | 725   894 |

The relative resistance to flame or combustion of each combustion of the examples of this invention and of the standards is demonstrated by the Oxygen Index Test (ASTM D-2863-70) data which designates the fraction of oxygen by volume in nitrogen required to just maintain flame for a material. Thus the higher the oxygen index for a material, the better its resistance to combustion and flame. The test was run upon specimens of the polymeric materials of the Examples and Control Standards in the form of a test slab or as an insulation covering on wire.

The oxygen index test demonstrates the pronounced improvement in flame resistance of the compositions of this invention over similar materials.

The copper mirror test which measures the potential corrosive properties of materials on metal, is as follows: A given sample of the material for evaluation is placed in a test tube together with a copper glass mirror comprising vacuum deposited copper of a known weight. The copper mirror is suspended in the test tube above the sample and the tube is sealed. The lower end of the sealed tube is then heated at 175° C for 16 hours in an oil bath or other suitable means while its upper end containing the copper mirror is maintained below 60° C. After heating for 16 hours, the copper mirror is removed and examined for evidence of corrosion, and if 50% or more of the copper is removed from the mirror, the material is classified as corrosive with respect to copper. Results are reported as the percentage of copper removed.

The phosphorylated novolak phenol-formaldehyde containing polymeric compounds showed no tendency to surface bloom or exude, whereas many organic phosphates such as triphenyl phosphate have poor compatibility with ethylene-containing polymers and rapidly exhibit bloom or exudation.

Referring to the drawing, there is shown a typical construction for an insulated electrical wire or cable product 10, comprising a metallic conductive element 12 and an overlying body or coating of polymeric insulation 14 extending thereabout or covering the conductor. In the drawing, the product 10 is illustrated as a short section with the insulation 14 removed from the end portion of the conductive element 12. According to one embodiment of this invention, the novel flame-resistant polyolefin thereof can be used to provide or form the insulation 14 on conductive element 12 of wire or cable product 10.

While not limiting this invention to any particular theory, it appears based upon the characteristics and behavior of the polyolefin products and observations thereof, that the unique chemical compound and its properties of this invention result from a reaction which, in the presence of the trialkyl cyanurate, chemically bonds the phosphorylated novolak phenol formaldehyde to the polyolefin polymer. For instance, it appears likely that "ester exchanges" occur between the triallyl cyanurate having a structure:

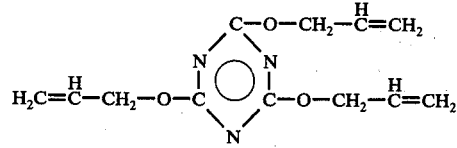

and the phosphorylated novolak during the mixing and/or curing steps, whereby the phosphorylated novolak is in turn effectively bonded to the polymer chains in the cured compound.

Although the invention has been described with reference to certain specific embodiments thereof, numerous modifications are possible and it is desired to cover all modifications falling within the spirit and scope of the invention.

What we claim as new and desire to secure by Letters Patent of the United States is:

1. A flame-resistant polyolefin compound comprising the combination of phosphorylated novolak phenol-formaldehyde and triallyl cyanurate, said phosphorylated novolak phenol-formaldehyde being the reaction product of phenol-formaldehyde condensation novolak resin and triphenylphosphate.

2. The flame-resistant polyolefin compound of claim 1, comprising about 5 to about 20 parts by weight of phosphorylated novolak phenol-formaldehyde and about 0.5 to about 5 parts by weight of triallyl cyanurate per 100 parts by weight of the polyolefin.

3. The flame-resistant polyolefin compound of claim 1, wherein the polyolefin comprises at least one ethylene-containing polymer selected from the group consisting of polyethylene, copolymers of ethylene and other polymerizable materials, and blends of such polymers.

4. A flame-resistant polyolefin compound comprising at least one ethylene-containing polymer selected from the group consisting of polyethylene, copolymers of ethylene and other polymerizable materials, and blends of such polymers, about 5 to about 20 parts by weight of phosphorylated novolak phenol-formaldehyde and about 0.5 to about 5 parts by weight of triallyl cyanurate per 100 parts by weight of the ethylene-containing polymer, said phosphorylated novolak phenol-formaldehyde being the reaction product of phenol-formaldehyde condensation novolak resin and triphenylphosphate.

5. The flame-resistant polyolefin compound of claim 4, wherein the compound has been crosslink cured to a substantially thermoset condition with a free radical forming organic peroxide curing agent.

6. The flame-resistant polyolefin compound of claim 5, comprising about 10 parts by weight of phosphorylated novolak phenol formaldehyde and about 1 part by weight of diallyl cyanurate per 100 parts by weight of the ethylene-containing polymer.

7. A method of rendering polyolefin compounds resistant to flame, comprising admixing the combination of phosphorylated novolak phenol-formaldehyde and triallyl cyanurate with a polyolefin compound, said phosphorylated novolak phenol-formaldehyde being the reaction product of phenol-formaldehyde condensation novolak resin and triphenylphosphate.

8. The method of claim 7, wherein the phosphorylated novolak phenol-formaldehyde in an amount of about 5 to about 20 parts by weight and the triallyl cyanurate in an amount of about 0.5 to about 5 parts by weight is admixed with 100 parts by weight of the polyolefin.

9. The method of claim 7, wherein the polyolefin compound comprises at least one ethylene-containing polymer selected from the group consisting of polyethylene, copolymers of ethylene and other polymerizable materials, and blends of such polymers.

10. A method of rendering polyolefin compounds resistant to flame comprising admixing the combination of about 5 to about 20 parts by weight of phosphorylated novolak phenol-formaldehyde and about 0.5 to about 5 parts by weight of triallyl cyanurate with 100 parts by weight of at least one ethylene-containing polymer selected from the group consisting of polyethylene, copolymers of ethylene and other polymerizable materials, and blends of such polymers, said phosphorylated novolak phenol-formaldehyde being the reaction product of phenol-formaldehyde condensation novolak resin and triphenyl phosphate.

11. The method of claim 10, wherein the compound is crosslink cured to a substantially thermoset condition by the addition of a free radical forming organic peroxide curing agent and heating the compound containing said curing agent.

12. The method of claim 11, wherein the phosphorylated novolak phenol-formaldehyde in an amount of about 10 parts by weight and the triallyl cyanurate in an amount of about 1 part by weight are admixed with 100 parts by weight of the polyolefin.

13. A flame-resistant polyolefin compound comprising the combination of triallyl cyanurate and the phosphorylated novolak phenol-formaldehyde reaction product of phenol formaldehyde condensation novolak resin and triphenylphosphate having the formula:

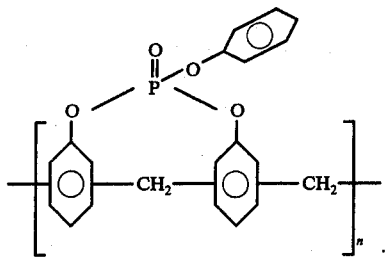

14. A flame-resistant polyolefin compound of claim 13, comprising about 5 to about 20 parts by weight of phosphorylated novolak phenol-formaldehyde and about 0.5 to about 5 parts by weight of triallyl cyanurate per 100 parts by weight of the polyolefin.

* * * * *